United States Patent [19]

Houck et al.

[11] Patent Number: 5,642,328

[45] Date of Patent: Jun. 24, 1997

[54] METHOD FOR DETERMINING VALIDITY OF SEISMIC REFLECTIONS BELOW LATERAL VELOCITY VARIATIONS

[75] Inventors: Richard T. Houck, Carrollton; Nancy J. House-Finch, Flower Mound, both of Tex.

[73] Assignee: Mobil Oil Corporation, Fairfax, Va.

[21] Appl. No.: 436,898

[22] Filed: May 8, 1995

[51] Int. Cl.$^6$ .................................................. G01V 1/36
[52] U.S. Cl. ........................................ 367/53; 367/38
[58] Field of Search ............................. 367/37, 38, 50, 367/53; 364/421

[56] References Cited

U.S. PATENT DOCUMENTS

| | | | |
|---|---|---|---|
| 5,157,637 | 10/1992 | Wang | 367/38 |
| 5,189,643 | 2/1993 | Wang et al. | 367/38 |
| 5,235,555 | 8/1993 | Albertin | 367/53 |

Primary Examiner—Ian J. Lobo
Attorney, Agent, or Firm—M. D. Keen

[57] ABSTRACT

A method for determining the reliability of time processed seismic reflection data near a significant velocity differential overhang includes displaying the seismic reflection data as a seismic section showing impedance differential interfaces. The position of an edge of the velocity differential overhang is located and acoustic velocity values are interpreted. A set of curves representing boundaries of reliability for predetermined dip values is determined. The set of curves representing boundaries of reliability may be displayed. The display of the set of curves representing boundaries of reliability may be overlaid on the seismic section representing the seismic reflection data. The dip angle for an interface of interest is approximated. The interface of interest is compared with the curve representing boundaries of reliability for the dip angle for the interface of interest to determine the extent of reliability of the data used to map the end of the interface under the overhang.

17 Claims, 3 Drawing Sheets

METHOD FOR DETERMINING VALIDITY OF SEISMIC REFLECTIONS BELOW LATERAL VELOCITY VARIATIONS

BACKGROUND OF THE INVENTION

1. Field of the Invention

The present invention pertains to determining the validity of seismic reflections and more particularly to determining the validity of seismic reflections that are interface reflections occurring below lateral velocity variations.

2. Related Prior Art

In acquiring seismic data, a seismic source is used to generate visco-elastic seismic acoustic waves that are directed into the earth's surface. At changes in the impedance of subsurface material, commonly called interfaces, the waves are partially reflected back in the direction of the seismic source at an angle governed by the law of reflection. The reflected portions of the waves are detected by seismic receivers. These receivers produce an electrical signal representing the reflected wave which may then be digitized and recorded. Further processing uses the recorded electrical signals to calculate the travel time of the wave, approximate the average velocity of the wave and determine the depth of the subsurface interface. In general, it is assumed that the recorded electrical signals represent (seismic) acoustic waves which have been reflected once.

The data obtained is usually presented in the form of time maps (e.g. seismic section, seismic trace, seismic sample, and the like) which are arranged according to time durations. The known factors are the source location, the receiver location and the time duration from generation to detection. The velocity of the seismic waves may be approximated by any one of the many methods presently in use. From these known quantities, the depth of the reflector is approximated by time migration followed by depth conversion. Depth conversion is the mapping of seismic traces on a depth scale, that is, converting data from time to depth. Time migration may be done-either before or after mid point or common depth point (CDP) data is stacked or combined.

Current seismic processing images p-wave reflection energy. For salt wedges, the reflection from a subsalt reflector is refracted, preventing the subsalt reflector from being imaged by time processing. Often, data that appears to be reflected data from beneath a salt overhang is mapped giving the appearance of accurate data showing various formations below the overhang. However, due to the nature of the overhang, this data could not be reflection data, at least not from the formations they inaccurately depict.

Much prior art has produced methods that attempt to image a subsurface formation below a significant lateral velocity differential, such as that of an irregular salt body. However, very little has been done to determine the reliability of time processed data that ostensibly depicts formations below the formations whose velocities vary laterally.

In general, the most commonly used prior art methods of time processing are incapable of determining the location of interfaces through surface generation of acoustic or seismic pulses when significant lateral velocity variations are present. Prior art methods of depth processing for accurately approximating these interfaces require very detailed velocity information and are not commonly used. In practice, most seismic data is processed using time processing. However, methods for determining the exact extent of reliable data from time processed data are not prevalent.

SUMMARY OF THE INVENTION

The present invention discloses a method for determining the reliability of seismic reflection data near a significant velocity differential overhang which includes displaying the seismic reflection data as a seismic section showing impedance differential interfaces. The location of an edge of the velocity differential overhang and acoustic velocity values are used to determine a set of curves representing boundaries of reliability for predetermined dip angle values. The set of curves which represent boundaries of reliability may be displayed. The display of the set of curves representing boundaries of reliability can be overlaid on seismic sections representing seismic reflection data. The dip angle for a selected interface of interest is approximated. The interface of interest is compared with the curve representing boundaries of reliability for the dip angle for the interface of interest to determine the extent of reliability of the data used to map the end of the interface under the overhang.

DESCRIPTION OF THE PREFERRED EMBODIMENT

The present invention discloses a method for computing the smallest imageable dip at a specified subsurface reflection point. For a given reflection point $(x_R, z_R)$, there is a minimum dip, $\alpha_{min}$, for which a normal incidence ray reaches the surface without encountering the salt body at $(x_S, z_S)$, (see FIG. 2). If the reflector at $(x_R, z_R)$ has a dip less than $\alpha_{min}$, the ray will encounter the salt body and be refracted in violation of the assumptions behind conventional time processing. The actual dip value can be computed from the reflector and salt coordinates and from the velocity function $V(z_R)$ between the reflection point and the surface.

A method for computing the smallest imageable dip at a specified subsurface reflection point. For a given reflection point there is a minimum dip for which a normal incidence ray reaches the surface without encountering the salt body. If the reflector at that point has a dip less than the minimum dip, the ray will encounter the salt body and be refracted in violation of the assumptions behind time processing. The actual dip value can be computed from the reflector and salt coordinates and from the velocity function between the reflection point and the surface.

Time processing of seismic data cannot correctly image reflectors whose normal incidence rays pass through an overlying strong lateral velocity variation. In this situation, processing frequently produces spurious events that cannot be valid reflections. This commonly occurs when mapping reflectors under salt overhangs in the Gulf of Mexico using time migrated data. Currently, interpreters have no mechanism for checking the validity of events during interpretation, resulting in processing artifacts being mapped as reflecting horizons. The method described here gives interpreters a quantitative guide for deciding whether an event is a valid time processing reflection or whether it is a processing artifact.

Figure 1:
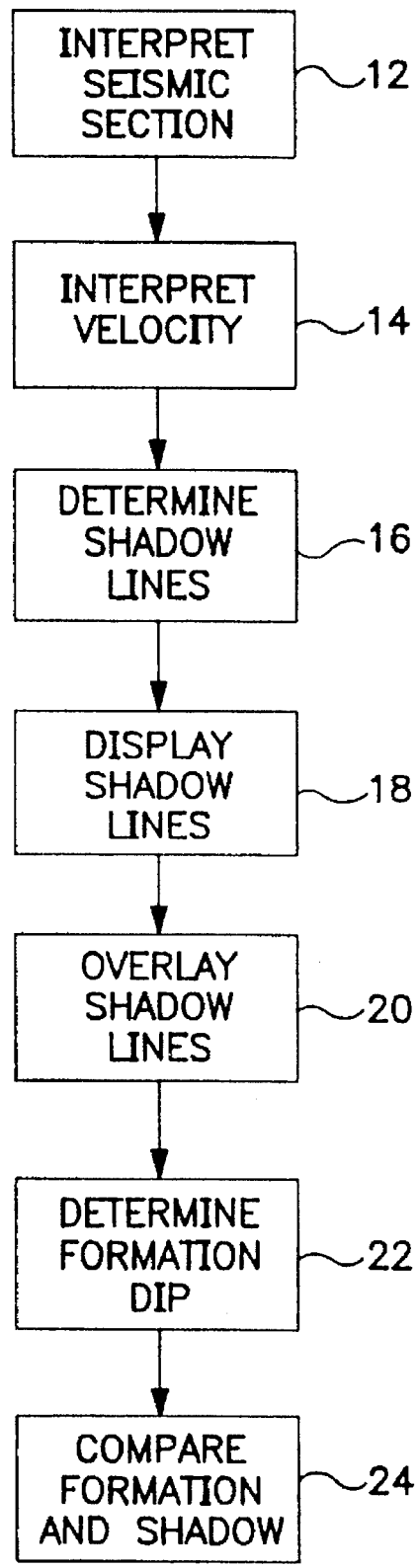
FIG. 1 is a block diagram of the process for determining the reliability of seismic reflection data.

Referring now to FIG. 1, the method of the present invention is illustrated in block form. At block 12 data is received and interpreted. The position of the edge of the salt or other interfering formation is determined at this point. Locating the position of the edge may be done either visually or by setting mathematical criteria which the data must satisfy. This data is preferably in the form of a seismic section although any form which can be translated into a seismic section may be used. At block 14 other pertinent information is received, such as velocity data.

At block 16 shadow lines are determined for each depth for predetermined dip angles. In the preferred embodiment shadow lines have been determined for dip angles in increments of ten degrees, from zero to sixty. In practice, shallower angles or larger angles may be eliminated or smaller or larger increments may be used, depending on the formations of the seismic section being viewed.

At block 18 the calculated shadow lines may be displayed and at block 20, the shadow line display may be overlaid on the seismic section. Again, in practice, the shadow lines may be displayed directly on the seismic section on a seismic interpretation workstation without being transferred to an overlay display, combining steps 18 and 20. However, in the preferred embodiment, the shadow lines are displayed on an overlay for simplicity.

At block 22 a formation along with its dip angle are determined. This is the formation of interest that will be analyzed to determine the farthest point under the overhang which is based on reliable reflection information.

At block 24 the shadow line for a dip angle corresponding to the dip angle of the formation of interest is selected. The point where the formation of interest intersects this shadow line is the point where the plot of the formation on the seismic section becomes unreliable (see FIG. 3).

Figure 2:
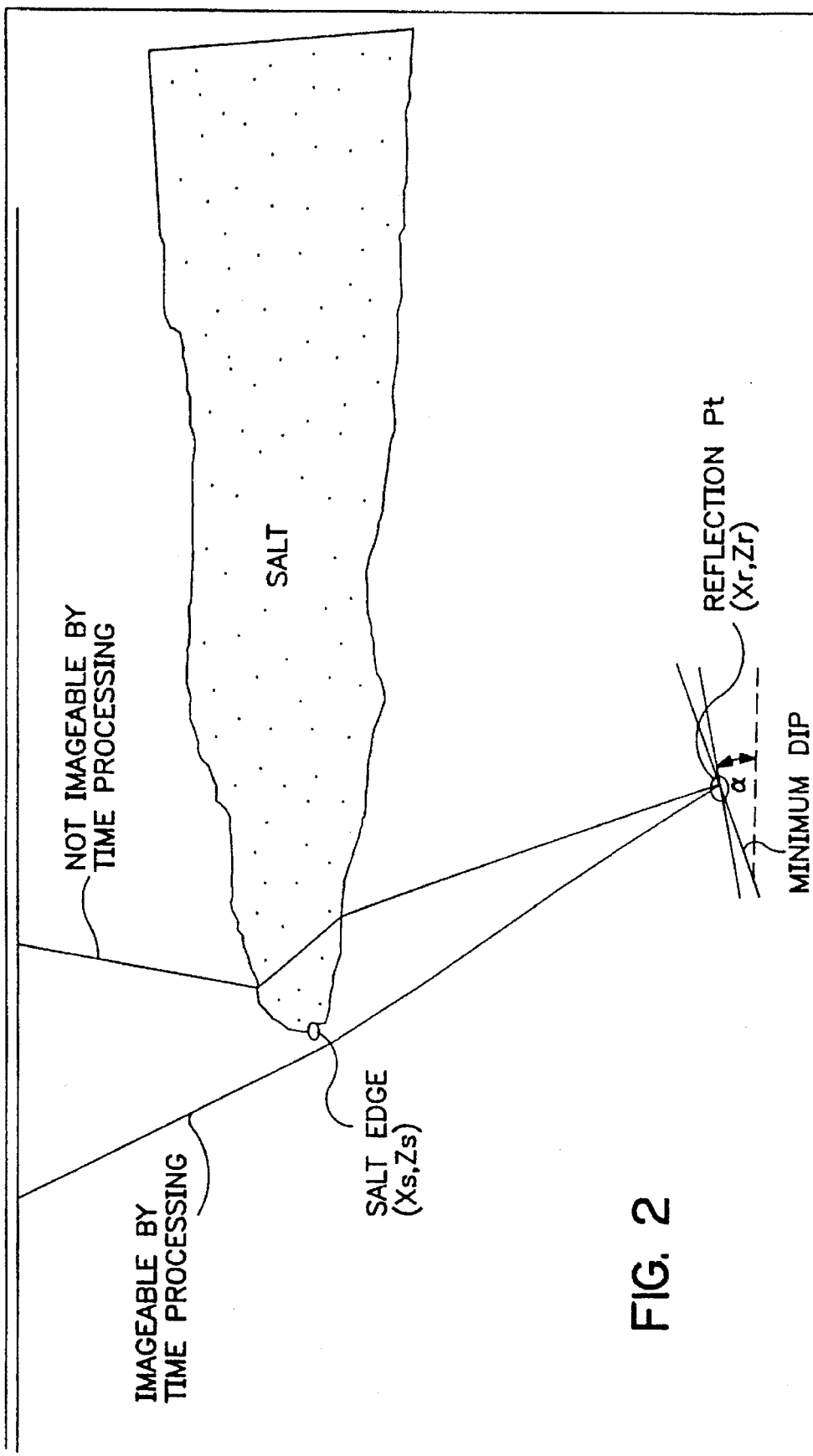
FIG. 2 is an illustration of subsurface formations showing the location of a salt layer, a dipping formation and a reflection point.

FIG. 2 shows how the method works. A basis for a method for computing the smallest imageable dip at a specified subsurface reflection point is illustrated. For a given reflection point $(x_R, z_R)$, there is a minimum dip $\alpha_{min}$ for which a normal incidence ray A reaches the surface without encountering the salt body at $(x_S, z_S)$. If the reflector at $(x_R, z_R)$ has a dip less than $\alpha_{min}$, the ray will encounter the salt body and be refracted in violation of the assumptions behind time processing. The actual dip value can be computed from the reflector and salt coordinates and from the velocity function $V(z_R)$ between the reflection point and the surface.

At any point below a salt overhang or other strong lateral velocity discontinuity, there is a minimum time imageable dip. If the reflector dip is less than this value, the normal incidence ray will encounter the velocity anomaly and will be refracted at the non-horizontal interfaces such that it will not satisfy the assumptions behind time processing.

For a seismic line that is a dip line relative to the reflectors of interest, we can compute the minimum imageable dip at each point in the subsurface, given the location of the end of the overhang and the local velocity function $V(z)$. By finding all the subsurface points where a particular reflector dip will result in imageable rays, a set of shadow lines can be displayed on the seismic data. These lines indicate the maximum distance under the overhang that a reflector with that dip should be mapped.

The shadow line for a reflector dip $\alpha_{min}$ is the set of all subsurface reflection points $(x_R, z_R)$ where a ray taking off at angle $\alpha_{min}$ encounters the leading edge of the velocity anomaly at $(x_S, z_S)$. For any medium where velocity $V(z)$ varies only with depth, as assumed by time processing, these reflection points can be found by using the ray integral:

$$x_R - x_S = \int_{z_a}^{z_a} \frac{pV(z)}{\sqrt{1-p^2V^2(z)}} dz$$

where:

$$p = \frac{\sin \alpha_{min}}{V(z_R)}$$

To define the shadow line for $\alpha_{min}$, a $z_R$ that is deeper than $z_S$ must be chosen and, to obtain the corresponding $x_R$, the ray integral must be numerically evaluated. This process is continued using successively deeper $z_R$ values until enough reflection points $(x_R, z_R)$ have been obtained to define the shadow line down to the maximum depth of interest.

For a general $V(z)$ case, this computation involves ray tracing through the layered velocity model. For the special cases of velocity constant or linearly increasing with depth, closed form expressions exist, although an iterative solution is needed for the linear $V(z)$ case.

The method requires that we be able to identify the ray that originates at the reflection point of interest and just touches the leading edge of the salt body at $(x_S, z_S)$. For constant velocity, the rays are straight and $$x_R - x_S = (z_R - z_S) \tan \alpha_{min}$$

This expression can be solved explicitly for any of the three quantities $x_R$, $z_R$, or $\alpha_{min}$ if the other two are specified. In the case of a linear dependence of velocity on depth, a closed form expression exists for the ray. Applying this to a ray from the reflection point to the salt edge gives:

$$x_S - x_R = \frac{1}{Kp} \cos \alpha_{min} - \sqrt{1 - p^2(V_0 + Kz_S)^2}$$

where $$V(z) = V_0 + Kz$$

and $$p = \frac{\sin \alpha_{min}}{z_R}$$

This expression can be solved iteratively for any of the three quantities $x_R$, $z_R$, or $\alpha_{min}$, given the other two. A general $V(z)$ can be handled by iterative ray tracing, by shooting a ray from the reflection point to the salt edge.

By finding all the subsurface points where a particular reflector dip will result in imageable rays, we can display a set of shadow lines on the seismic data that show the maximum distance under the overhang that a reflector with that dip should be mapped.

Figure 3:
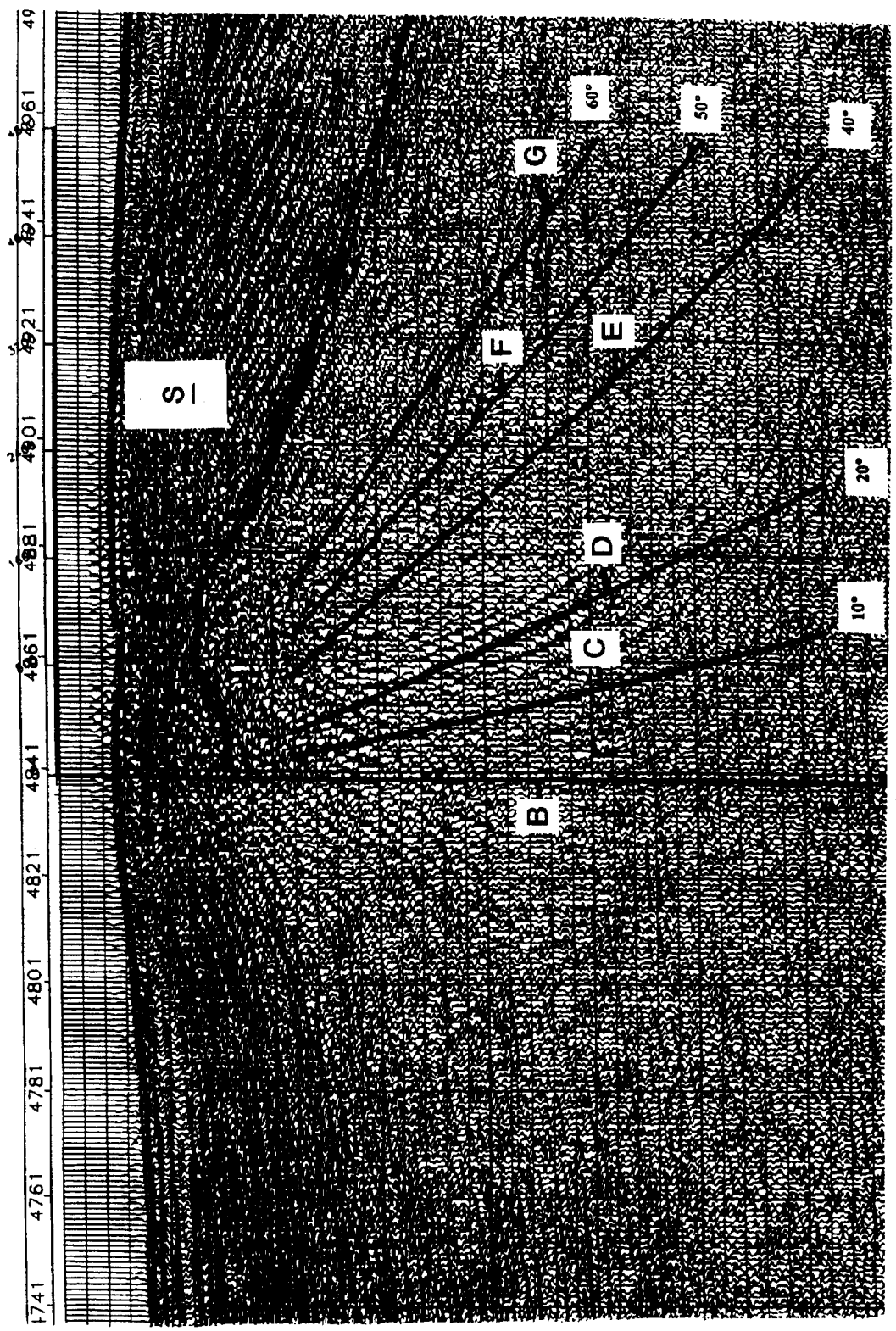
FIG. 3 is a seismic section illustrating subsurface formations with a shadow line display overlaid.

FIG. 3 shows an example of such a shadow line display on a seismic section. A base line B is lined up with the leading edge of a salt formation S. Shadow lines C, D, E, F and G indicate, as a function of seismic time or depth, the maximum distance behind the salt overhang that a reflector with the specified dip, ten degrees, twenty degrees, forty degrees, fifty degrees and sixty degrees, respectively, would be imageable. When overlaid on a seismic section, lines C, D, E, F and G constitute boundaries beyond which no events of that dip should be interpreted.

For display on a migrated seismic section, the depth coordinate has been converted to image ray (migrated) time using a known $V(z)$.

The restriction to dip lines is easily circumvented for three dimensional seismic surveys by extracting a series of arbitrary lines from the three dimensional data volume that are locally dip to the structure of interest (but not necessarily dip to the velocity anomaly). By constructing shadow lines (as in FIG. 3) on each of the arbitrary dip lines, we can define a set of shadow "curtains" in three dimensional space. As in the two dimensional case, interpreters can use these shadow surfaces to decide which events are valid reflections and which events are processing artifacts.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

We claim:

1. A method for determining the reliability of time processed seismic reflection data below a significant lateral velocity variation overhang comprising the steps of:

displaying the seismic reflection data as a seismic section showing impedance differential interfaces;

locating a position of an edge of the velocity differential overhang;

interpreting acoustic velocity values;

determining a set of curves representing boundaries of reliability for predetermined dip values to provide a display of said curves;

overlaying said display of said set of curves representing boundaries of reliability on said seismic section representing the seismic reflection data;

approximating a dip angle for an interface of interest; and comparing said interface of interest with said curve representing boundaries of reliability for said dip angle for said interface of interest to determine its extent of reliability.

2. The method according to claim 1 wherein said step of determining a set of curves includes the step of:

calculating the extent of the reliability of information for a constant velocity.

3. The method according to claim 2 wherein said step of calculating includes the step of:

determining shadow lines using the formula $$x_R - x_S = (z_R - z_S) \tan \alpha_{min}$$

where $(x_R, z_R)$ are the coordinates for a reflection point, $\alpha_{min}$ is the minimum dip angle for which a normal incidence ray reaches the surface without encountering the velocity differential overhang, and $(x_S, z_S)$ are the coordinates of the edge of the velocity differential overhang.

4. The method according to claim 1 wherein said step of determining a set of curves includes the step of:

calculating the extent of the reliability of information for a linear varying velocity.

5. The method according to claim 4 wherein said step of calculating includes the step of:

determining shadow lines using the formula $$x_S - x_R = \frac{1}{Kp} \cos \alpha_{min} - \sqrt{1 - p^2(V_0 + Kz_S)^2}$$

where $V(z) = V_0 + Kz$ and $$p = \frac{\sin \alpha_{min}}{z_R}$$

$(x_R, z_R)$ are the coordinates for a reflection point, $\alpha_{min}$ is the minimum dip angle for which a normal incidence ray reaches the surface without encountering the velocity differential overhang, and $(x_S, z_S)$ are the coordinates of the edge of the velocity differential overhang.

6. A method for determining the reliability of seismic reflection data near a significant velocity differential overhang comprising the steps of:

displaying the seismic reflection data as a time processed seismic section showing impedance differential interfaces;

locating a position of an edge of the velocity differential overhang;

interpreting acoustic velocity values;

determining a set of curves representing boundaries of reliability for predetermined dip values to provide a display of said curves;

overlaying said display of said set of curves representing boundaries of reliability on said seismic section representing the seismic reflection data;

approximating a dip angle for an interface of interest; and comparing said interface of interest with said curve representing boundaries of reliability for said dip angle for said interface of interest to determine its extent of reliability.

7. The method according to claim 6 wherein said step of determining a set of curves includes the step of:

calculating the spatial extent of the reliability of information for a constant velocity.

8. The method according to claim 7 wherein said step of calculating includes the step of:

determining shadow lines using the formula $$x_R - x_S = (z_R - z_S) \tan \alpha_{min}$$

where $(x_R, z_R)$ are the coordinates for a reflection point, $\alpha_{min}$ is the minimum dip angle for which a normal incidence ray reaches the surface without encountering the velocity differential overhang, and $(x_S, z_S)$ are the coordinates of the edge of the velocity differential overhang.

9. The method according to claim 6 wherein said step of determining a set of curves includes the step of:

calculating the extent of the reliability of information for a linear varying velocity.

10. The method according to claim 9 wherein said step of calculating includes the step of:

determining shadow lines using the formula $$x_S - x_R = \frac{1}{Kp} \cos \alpha_{min} - \sqrt{1 - p^2(V_0 + Kz_S)^2}$$

where $V(z) = V_0 + Kz$ and $$p = \frac{\sin \alpha_{min}}{z_R}$$

($x_R$, $z_R$) are the coordinates for a reflection point, $\alpha_{min}$ is the minimum dip angle for which a normal incidence ray reaches the surface without encountering the velocity differential overhang, and ($x_S$, $z_S$) are the coordinates of the edge of the velocity differential overhang.

11. A method for providing a measure for the reliability of seismic reflection data near a significant velocity differential overhang comprising the steps of:

locating a position of an edge of the velocity differential overhang;

interpreting acoustic velocity values;

determining a set of curves representing boundaries of reliability for predetermined dip values;

approximating a dip angle for an interface of interest; and comparing said interface of interest with said curve representing boundaries of reliability for said dip angle for said interface of interest to determine its extent of reliability.

12. The method according to claim 11 wherein said step of determining a set of curves includes the step of:

calculating the extent of the reliability of information for a constant velocity.

13. The method according to claim 12 wherein said step of calculating includes the step of:

determining shadow lines using the formula $$x_R - x_S = (z_R - z_S) \tan \alpha_{min}$$

where ($x_R$, $z_R$) are the coordinates for a reflection point, $\alpha_{min}$ is the minimum dip angle for which a normal incidence ray reaches the surface without encountering the velocity differential overhang, and ($x_S$, $z_S$) are the coordinates of the edge of the velocity differential overhang.

14. The method according to claim 13 also including the steps of:

displaying the seismic reflection data as a time processed seismic section showing impedance differential interfaces;

overlaying said set of curves representing boundaries of reliability on said seismic section representing the seismic reflection data.

15. The method according to claim 11 wherein said step of determining a set of curves includes the step of:

calculating the extent of the reliability of information for a linear varying velocity.

16. The method according to claim 15 wherein said step of calculating includes the step of:

determining shadow lines using the formula $$x_S - x_R = \frac{1}{Kp} \cos \alpha_{min} - \sqrt{1 - (p^2(V_0 + Kz_S)^2)}$$

where $V(z) = V_0 + Kz$ and $$p = \frac{\sin \alpha_{min}}{z_R}$$

($x_R$, $z_R$) are the coordinates for a reflection point, $\alpha_{min}$ is the minimum dip angle for which a normal incidence ray reaches the surface without encountering the velocity differential overhang, and ($x_S$, $z_S$) are the coordinates of the edge of the velocity differential overhang.

17. The method according to claim 16 also including the steps of:

displaying the seismic reflection data as a time processed seismic section showing impedance differential interfaces;

overlaying said set of curves representing boundaries of reliability on said seismic section representing the seismic reflection data.

* * * * *